Sept. 4, 1956  C. B. VOGEL  2,762,032
SEISMIC HYDROPHONE
Filed Nov. 26, 1954

INVENTOR:
CHARLES B. VOGEL
BY
HIS ATTORNEY

United States Patent Office 2,762,032
Patented Sept. 4, 1956

2,762,032

SEISMIC HYDROPHONE

Charles Brunson Vogel, Houston, Tex., assignor to Shell Development Company, New York, N. Y., a corporation of Delaware Application November 26, 1954, Serial No. 471,323

6 Claims. (Cl. 340—10)

This invention pertains to seismic detectors or hydrophones, and relates more particularly to a piezo-electric hydrophone of special construction and to a cable or streamer carrying a plurality of such piezo-electric detectors for use in underwater geophysical work, e. g., in offshore seismic exploration, in the determination of seismic velocities, in acoustical well logging, and the like.

Detectors used for the reception of seismic or acoustic impulses in submerged areas or in wells having a liquid column standing therein are usually of the seismometer, or velocity-wave responsive type, or of the hydrophone, or pressure-wave responsive type. A plurality of such detectors can be attached to or incorporated in a cable or streamer for the purpose of measuring vertical seismic velocities in wells, or for carrying offshore seismic exploration work.

Devices of the above-mentioned types have certain drawbacks. Detectors of the velocity responsive type, when used in wells for vertical velocity determinations or for acoustic logging, are sensitive not only to energy traveling through the liquid, but also to that traveling along the cable. If the velocity of propagation is higher in the cable than in the surrounding medium, it is usually not possible to determine accurately the time at which the true seismic wave arrives at a given depth, this being obscured by the earlier arrival of the cable vibrations. The same is true to a certain extent of hydrophones, especially when the latter comprise a piezo-electric element which may come in contact with the wall of a borehole. The sensitivity of piezo-electric elements of certain types is moreover unfavorably affected by high temperatures prevailing in wells. Streamer cables carrying a plurality of detectors are usually of a very complex and costly construction, requiring the cable to be broken at each detector to effect a connection with the cable conductors.

It is therefore an object of this invention to provide a piezo-electric seismic detector free of the drawbacks mentioned above.

It is particularly an object of this invention to provide a seismic hydrophone having a hollow cylindrical piezo-electric element adapted to be slipped over the cable and to be electrically connected thereto without requiring the cable to be broken or cut into separate parts at this point to effect the electrical connection.

It is further an object of this invention to provide a seismic hydrophone wherein said piezo-electric element is made of barium titanate.

It is also an object of this invention to provide a seismic hydrophone having a guard member protecting its pressure responsive piezo-electric element from forces impressed thereon by the bending or twisting of the cable during operations, or by contact with outside objects.

It is also an object of this invention to provide a geophysical cable or streamer comprising a plurality of seismic hydrophones of the type referred to above.

These and other objects of this invention will be understood from the following description taken with reference to the attached drawing, wherein.

Figure 1:
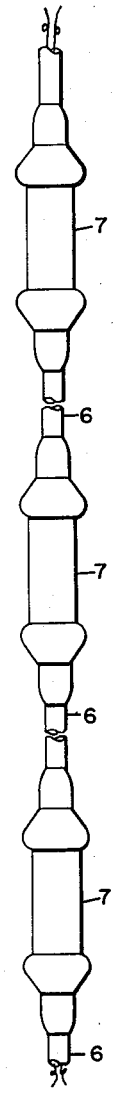
Fig. 1 is a diagrammatic view of the cable or streamer embodying the present invention.

As shown in Fig. 1, the present geophysical cable or streamer comprises an insulated cable 6 of any desired length, provided with a plurality of hydrophones generally indicated at 7. The hydrophones 7 are carried by the cable at suitable spacings from each other, such as 20 feet in well logging work, or 5 to 300 feet in offshore seismic exploration. The number of hydrophones carried by the cable 6 may vary between very wide limits, such as from 3 to 200.

Figure 2:
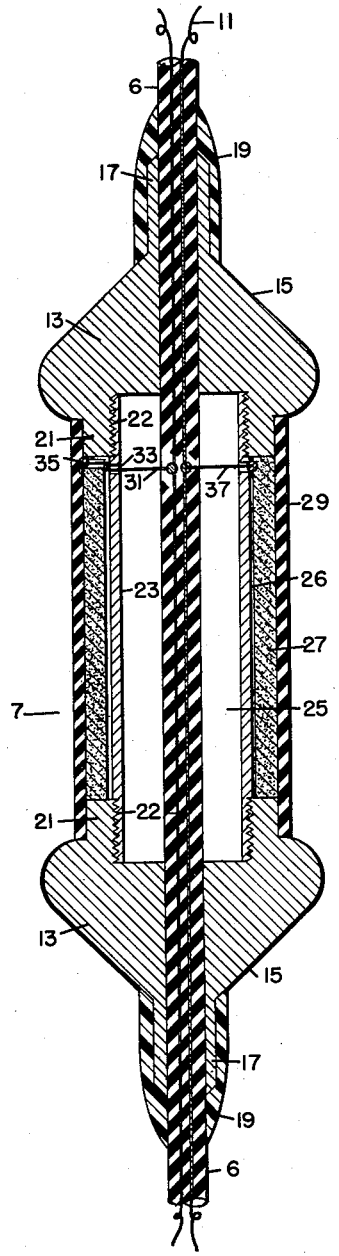
Fig. 2 is a cross-section view of the piezo-electric hydrophone of the present invention.

As more particularly shown in Fig. 2 the cable 6 is made of a suitable rubber composition and carries imbedded therein a plurality of electrical conductors 11, the number of said conductors being sufficient to permit all the hydrophones carried by the cable to be suitably connected thereto. Besides the conductors 11, the cable 6 may be provided with reinforcing longitudinal stress members or steel cables, and with longitudinal spaces or cavities adapted to be filled with oil to give the cable a desired buoyancy. These features do not however form a part of this invention, and are not shown in Fig. 2.

Each hydrophone 7 comprises two end members 13 slipped or threaded on the cable 6 and having outwardly directed faces 15 of a generally conical shape for streamlining purposes. The members 13 are made of a suitable material, such as aluminum, steel, copper or a plastic, and have outward portions 17 of reduced diameter. After the hydrophones 7 have been assembled and threaded on the cable 6, they may be anchored thereto by winding tape, such as vinyl tape, over the cable and the reduced ends 17, or by fusing said elements together with some suitable plastic material, as indicated at 19. Vinylite seals or vinyl tape are satisfactory so far as mechanical strength is concerned, and provide a pressure seal for hydrostatic pressures up to about 500 p. s. i. or more.

The members 13 have inwardly directed ends likewise of a somewhat reduced diameter, as shown at 21. The ends 21 have inside screw threads 22 for engagement with corresponding outside screw threads of a tubular guard or sleeve element 23, preferably also made of a material such as aluminum, etc. The thickness and inner diameter of sleeve 23 are selected to provide a substantial clearance between said sleeve and cable 6, thereby forming a space 25 for purposes described hereinbelow.

Surrounding the reinforcing tubular guard element 23, and separated therefrom by a small clearance or gap 26, of the order of $\frac{1}{16}$ of an inch, is a pressure sensitive piezo-electric element, such preferably as a hollow barium titanate cylinder 27. Loosely held between the portions 21 of the two ends 13, the barium titanate cylinder is protected from direct contact with the outside by means of a flexible or plastic sheath 29, made of rubber or a suitable synthetic composition, which sheath is passed over the piezo-electric cylinder and is suitably anchored to the elements 21.

A wire 31 passes through a hole 33 drilled in the sleeve 23 and a notch formed in the end face of the barium titanate cylinder, and is electrically connected at one end to the outside face of the annular cylinder 27, as shown at 35, and at the other end to one of the conductors 11 of the cable 6. A second wire 37 similarly connects a point on the inside face of the cylinder 27 with another cable conductor.

Due to the arrangement shown, and particularly to the use of the rubber or plastic elements 19 and 29, the space 25 and gap 26 remain filled with air or a suitable gas even when the detectors are immersed in water and subjected to considerable hydrostatic pressures.

The theory and mode of operation of piezo-electric hydrophones or detectors is well-known and need not be enlarged upon here. It is sufficient to state that pressure waves traveling through an elastic body impinge on the present hollow barium titanate cylinder and create transient potential differences between the faces thereof, which potential differences are transmitted by the cable 6 to a suitable instrument for recording purposes. Barium titanate piezo-electric elements have moreover the following advantages over piezo-electric elements of other types: they have a high capacity and thus a relatively lower internal impedance; they have a large mechanical coefficient of coupling and are thus very efficient; they are relatively insensitive to temperature changes and are not permanently damaged by moisture.

In particular, any desired number of the present detectors, such as up to 40 or more, may be strung on a cable and towed behind a recorder boat while charges of dynamite are exploded at suitable distances and depths for seismic exploration purposes.

Likewise one, two or more of these detectors may be lowered on a cable into a well or borehole for purposes of seismic velocity determination or seismic or acoustic logging of the formations traversed by the bore hole. In such cases, the explosions or pulses to be recorded may be generated either at the surface, within or adjacent the well, or relatively close to said detectors, for example, by means of a pulse source lowered into the well together with the detectors, as described in my patent No. 2,651,027 or my copending application Serial No. 284,867, filed April 29, 1952, now Patent No. 2,708,485, issued May 17, 1955. Other uses of the present detectors will occur to those skilled in the art.

It will be appreciated that the rigid bracing sleeve 23 forms an essential feature or element of the present invention, since said sleeve, interposed between the cable 6 and the hollow barium titanate cylinder 27, prevents the cable, on twisting or bending during use, from applying mechanical forces to the hollow crystal cylinder, thereby creating spurious electric signals. Further protection against spurious electric signals is provided by the guard ends 13, whose maximum outside diameter is considerably greater than that of the cylinder 27, which is thus guarded against shocks and contact with obstacles. In particular, it is desirable to keep the barium titanate element out of contact with the walls of a borehole during well logging operations since, when such contact occurs, vibrations traveling along the cable cause forces to be applied to the piezo-electric element, and spurious voltages to be produced by the latter.

The space 25 between the cable 6 and the guard sleeve 23 is provided with the object of accommodating a special transformer in cases where it is thought desirable to use one to step down the high impedance of the piezo-electric element in accordance with particular circuit design requirements.

Figure 3:
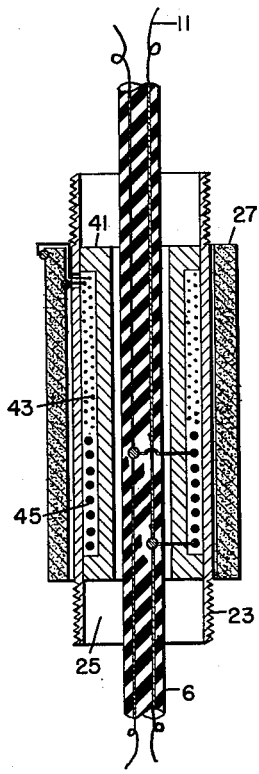
Fig. 3 is a partial view of a modification of the device of Fig. 2.

One of the ways in which this can be achieved is illustrated in Fig. 3, wherein a flanged tube 41 is positioned in the space 25 around the cable 6 and inside the guard sleeve 23. The tube 41, which may be advantageously made of a magnetic material, serves as a core for a transformer provided with a primary 43, having a relatively great number of turns of wire connected to the element 27, and a secondary 45, having a relatively small number of turns connected to the cable 6. The tubular guard 23 may in such case be likewise made of a magnetic metal to provide a closed path for the magnetic flux of the transformer.

I claim as my invention:

1. In combination with an insulated conductor cable, a hydrophone comprising a hollow cylindrical piezo-electric element surrounding said cable and electrically connected thereto, a rigid tubular guard positioned between said cable and said piezo-electric element, and end members surrounding said cable and anchored thereto, said end members being rigidly connected to said tubular guard at both ends thereof, the outside diameter of said end members being considerably greater than that of said piezo-electric element, whereby said piezo-electric element is normally protected by said end members from contact pressure by extraneous objects capable of producing spurious voltages in said element.

2. In combination with an insulated conductor cable, a hydrophone comprising a hollow cylindrical piezo-electric element surrounding said cable and electrically connected thereto, a flexible sheath positioned over the outer face of said element, a rigid tubular guard positioned between said element and said cable, there being a relatively small clearance between said piezo-electric element and said tubular guard, and a relatively large clearance forming an annular chamber between said cable and said tubular guard, and end members surrounding said cable and anchored thereto, said end members being rigidly connected to said tubular guard at both ends thereof, the outside diameter of said end members being considerably greater than that of said piezo-electric element, whereby said piezo-electric element is normally protected by said end members from contact pressure by extraneous objects capable of producing spurious voltages in said element.

3. In combination with an insulated conductor cable, a hydrophone comprising a hollow cylindrical piezo-electric element surrounding said cable and electrically connected thereto, a flexible sheath positioned over the outer face of said element, a rigid tubular guard positioned between said element and said cable, there being a relatively small clearance between said piezo-electric element and said tubular guard, and a relatively large clearance forming an annular chamber between said cable and said tubular guard, a transformer disposed within said chamber, said transformer having its primary electrically connected to said piezo-electric element and its secondary to said conductor cable, and end members surrounding said cable and anchored thereto, said end members being rigidly connected to said tubular guard at both ends thereof, the outside diameter of said end members being greater than that of said piezo-electric element.

4. The hydrophone of claim 1, wherein said piezo-electric element is a hollow cylinder formed of barium titanate.

5. The hydrophone of claim 1, having streamlined end members with generally conical diverging faces.

6. For use in geophysical work, a cable comprising a plurality of conductors embedded in an insulating material, a plurality of hydrophones spaced along said cable, each of said hydrophones comprising a hollow barium titanate cylinder surrounding said cable and electrically connected to two of the conductors within said cable, a rigid tubular guard positioned between said cable and said barium titanate cylinder, said tubular guard having streamlined end members anchored to said cable, the outside diameter of said end members being considerably greater than that of said barium titanate cylinder, whereby said barium titanate cylinder is normally protected by said end members from contact pressure by extraneous objects capable of producing spurious voltages in said cylinder.

References Cited in the file of this patent

UNITED STATES PATENTS

| 2,405,225 | Mason | Aug. 6, 1946 |
| 2,708,742 | Harris | May 17, 1955 |